(12) United States Patent
Somers et al.

(10) Patent No.: US 10,940,393 B2
(45) Date of Patent: Mar. 9, 2021

(54) CUSTOMIZED MODELS FOR IMITATING PLAYER GAMEPLAY IN A VIDEO GAME

(71) Applicant: Electronic Arts Inc., Redwood City, CA (US)

(72) Inventors: Caedmon Somers, Delta (CA); Jason Rupert, Port Coquitlam (CA); Igor Borovikov, Foster City, CA (US); Ahmad Beirami, Redwood City, CA (US); Yunqi Zhao, Sunnyvale, CA (US); Mohsen Sardari, Redwood City, CA (US); Harold Henry Chaput, Belmont, CA (US); Navid Aghdaie, San Jose, CA (US); Kazi Atif-Uz Zaman, Foster City, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 16/460,871

(22) Filed: Jul. 2, 2019

(65) Prior Publication Data

US 2021/0001229 A1 Jan. 7, 2021

(51) Int. Cl.
*A63F 13/67* (2014.01)
*A63F 13/56* (2014.01)
*G06N 20/00* (2019.01)

(52) U.S. Cl.
CPC ............. *A63F 13/67* (2014.09); *A63F 13/56* (2014.09); *G06N 20/00* (2019.01); *A63F 2300/6027* (2013.01); *A63F 2300/64* (2013.01)

(58) Field of Classification Search
None
See application file for complete search history.

(56) References Cited

U.S. PATENT DOCUMENTS

| | | | |
|---|---|---|---|
| 5,274,801 A | 12/1993 | Gordon | |
| 5,683,082 A | 11/1997 | Takemoto et al. | |
| 6,253,193 B1 | 6/2001 | Ginter et al. | |
| 7,390,254 B2 | 6/2008 | Hirai | |

(Continued)

FOREIGN PATENT DOCUMENTS

CN 104657412 A 5/2015

OTHER PUBLICATIONS

Donges, Niklas, Transfer Learning—Towards Data Science, Apr. 23, 2018, https://towardsdatascience.com/transfer-learning-946518f95666, downloaded May 22, 2019 in 10 pages.
Bengio, et al, Curriculum Learning, Proceedings of the 26th International Conference on Machine Learning, 2009, in 8 pages.
Ho, et al, Generative Adversarial Imitation Learning, pp. 1-14, arXiv:1606.03476v1 [cs.LG] Jun. 10, 2016.

(Continued)

*Primary Examiner* — Ronald Laneau
(74) *Attorney, Agent, or Firm* — Knobbe, Martens, Olson & Bear, LLP

(57) ABSTRACT

Systems and methods are disclosed for training a machine learning model to control an in-game character or other entity in a video game in a manner that aims to imitate how a particular player would control the character or entity. A generic behavior model that is trained without respect to the particular player may be obtained and then customized based on observed gameplay of the particular player. The customization training process may include freezing at least a subset of layers or levels in the generic model, then generating one or more additional layers or levels that are trained using gameplay data for the particular player.

20 Claims, 6 Drawing Sheets

(56) References Cited

U.S. PATENT DOCUMENTS

| | | | |
|---|---|---|---|
| 8,100,770 | B2 | 1/2012 | Yamazaki et al. |
| 8,142,282 | B2 | 3/2012 | Canessa et al. |
| 8,267,764 | B1 | 9/2012 | Aoki et al. |
| 8,398,476 | B1 | 3/2013 | Sidhu et al. |
| 8,540,560 | B2 | 9/2013 | Crowley et al. |
| 8,907,193 | B2 | 12/2014 | Cross et al. |
| 8,914,251 | B2 | 12/2014 | Ohta |
| 9,069,441 | B2 | 6/2015 | Jacob |
| 9,616,329 | B2 | 4/2017 | Szufnara et al. |
| 9,919,217 | B2 | 3/2018 | Aghdaie et al. |
| 10,105,603 | B2 | 10/2018 | Bucher |
| 10,286,323 | B2 | 5/2019 | Aghdaie et al. |
| 10,357,718 | B2 | 7/2019 | Aghdaie et al. |
| 10,478,730 | B1 | 11/2019 | Burnett |
| 10,569,176 | B2 * | 2/2020 | D'angelo ............... A63F 13/533 |
| 10,713,543 | B1 | 7/2020 | Skuin et al. |
| 2004/0067788 | A1 | 4/2004 | Angelopoulos |
| 2004/0152512 | A1 | 8/2004 | Collodi et al. |
| 2005/0130725 | A1 | 6/2005 | Creamer et al. |
| 2007/0066403 | A1 | 3/2007 | Conkwright |
| 2008/0268961 | A1 | 10/2008 | Brook |
| 2011/0295649 | A1 | 12/2011 | Fine et al. |
| 2012/0083330 | A1 | 4/2012 | Ocko |
| 2012/0115580 | A1 | 5/2012 | Hornik et al. |
| 2012/0220376 | A1 | 8/2012 | Takayama et al. |
| 2012/0233105 | A1 | 9/2012 | Cavallaro et al. |
| 2012/0244941 | A1 | 9/2012 | Ostergren et al. |
| 2012/0276964 | A1 | 11/2012 | Jones et al. |
| 2013/0316779 | A1 | 11/2013 | Vogel |
| 2013/0316795 | A1 | 11/2013 | Vogel |
| 2014/0235346 | A1 | 8/2014 | Kim et al. |
| 2014/0274370 | A1 * | 9/2014 | Shah ....................... A63F 13/22 463/31 |
| 2015/0339532 | A1 | 11/2015 | Sharma et al. |
| 2016/0005270 | A1 | 1/2016 | Marr et al. |
| 2016/0067612 | A1 | 3/2016 | Ntoulas et al. |
| 2017/0259177 | A1 | 9/2017 | Aghdaie et al. |
| 2018/0001216 | A1 * | 1/2018 | Bruzzo ................... A63F 13/30 |
| 2018/0161673 | A1 | 6/2018 | Pasternack et al. |
| 2018/0161682 | A1 | 6/2018 | Myhill |
| 2018/0169526 | A1 | 6/2018 | Aghdaie et al. |
| 2018/0243656 | A1 | 8/2018 | Aghdaie et al. |
| 2019/0294881 | A1 | 9/2019 | Polak et al. |
| 2019/0354759 | A1 | 11/2019 | Somers et al. |
| 2019/0381407 | A1 | 12/2019 | Aghdaie et al. |
| 2019/0388789 | A1 | 12/2019 | Aghdaie et al. |
| 2020/0078685 | A1 | 3/2020 | Aghdaie et al. |

OTHER PUBLICATIONS

Aponte et al., "Measuring the level of difficulty in single player video games," Elsevier, Entertainment Computing (2011) 205-213.

Aristidou et al., "Inverse Kinematics Techniques in Computer Graphics: A Survey," Comp Graphics Forum, vol. 00:1-24 (2017).

Biggs et al., "Creatures Great and SMAL: Recovering the Shape and Motion of Animals from Video", Dec. 6, 2018, Springer, Computer Vision—ACCV: Asian Conference on Computer Vision 2018, pp. 3-19.

Chen et al., "Visualization System for Animating Vertebrate Animal Models", 2012, IEEE, 2012 Conference on Technologies and Applications of Artificial Intelligence, pp. 244-249.

Chou et al., "Self Adversarial Training for Human Pose Estimation", Nov. 15, 2018, APSI PA, Proceedings, APSI PA Annual Summit and Conference 2018, pp. 17-30.

Davis et al., "A Sketching Interface for Articulated Figure Animation," Eurographics—SIGGRAPH Symp on Comp Animation (2003).

Du et al., "Hierarchical Recurrent Neural Network for Skeleton Based Action Recognition", Jun. 2015, IEEE, The IEEE Conference on Computer Vision and Pattern Recognition (CVPR) 2015, pp. 1110-1118.

Isola et al., "Image-to-Image Translation with Conditional Adversarial Networks," BAIR Lab, UC Berkeley (Nov. 26, 2018).

Kanazawa et al., "Learning Category-Specific Mesh Reconstruction from Image Collections", 2018, The European Conference on Computer Vision (ECCV), pp. 371-386.

Mehta et al., "Vnect: Real-time 3D Human Pose Estimation with a Single RGB Camera," ACM Transactions on Graphics, vol. 36:4 (Jul. 2017).

Pittman, "The Pac-Man Dossier," Gamasutra, downloaded on Jun. 1, 2018, available at <<https://web.archive.org/web/20161107115846/https://www.gamasutra.com/view/feature/3938/the_pacman_dossier.php?print=1>>.

Pruett, "Defining the All-Important Difficulty Curve," J of Ed, Comm & Value, vol. 8:1, Jan.-Feb. 2008, http ://com mons.pacificu.edu/cg i/viewcontent.cg i?article= 1002&context=inter08.

Shih et al., "Video-based Motion Capturing for Skelton-based 3D Models," National Taiwan University (2009).

Shorten, "Image-to-Image Translation with Conditional Adversarial Networks," Pix2Pix, https://towardsdatascience.com/pix2pix.869c17900998?gi=e4c177e8a7c7 (Jan. 29, 2019).

Van de Panne, "Control for Simulated Human and Animal Motion," Dept Comp Sci, University of Toronto (1998).

Zweng et al., "Unexpected Human Behavior Recognition in Image Sequences using Multiple Features", Aug. 26, 2010, IEEE, 2010 20th International Conference on Pattern Recognition, pp. 368-371.

* cited by examiner

CUSTOMIZED MODELS FOR IMITATING PLAYER GAMEPLAY IN A VIDEO GAME

INCORPORATION BY REFERENCE TO ANY PRIORITY APPLICATIONS

Any and all applications for which a foreign or domestic priority claim is identified in the Application Data Sheet as filed with the present application are hereby incorporated by reference.

BACKGROUND

Video games often include both player-controlled characters and non-player characters (NPCs). A player traditionally controls his or her player-controlled character in a video game through commands provided via a game controller (such as a controller with buttons, a directional pad, a joystick, and/or other physical control mechanisms), a keyboard, a mouse, a touchscreen or other input device. Often a multiplayer game enables multiple remotely located players to play together in a cooperative manner, such as on the same team, party, clan, or other grouping. Multiplayer games may additionally or alternatively include players competing against other, either individually or as teams.

Many video games include software-controlled virtual entities or characters, in addition to player-controlled virtual entities or characters. In video games, these software-controlled or programmatically controlled characters may sometimes be referred to as computer players, bots, artificial intelligence ("AI") units, AI characters, or non-player characters (NPCs). NPCs can be programmed to respond to in-game stimuli (such as in-game actions or occurrences involving other NPCs or player-controlled characters) in a manner that appears realistic to a human player. Traditionally, the behavior for a given NPC is typically programmed in advance as part of the game development process.

SUMMARY OF EMBODIMENTS

The systems, methods, and devices of this disclosure each have several innovative aspects, no single one of which is solely responsible for the all of the desirable attributes disclosed herein.

In some embodiments, a system may include a data store that stores a generic player behavior model associated with one or more video games, where the generic player behavior model is configured to provide an indication of an in-game action to be performed in each of a plurality of gameplay situations. The system may further include a computing system in electronic communication with the data store and configured to execute computer-readable instructions that configure the computing system to: retrieve the generic player behavior model from the data store, where the generic player behavior model has been trained prior to retrieval based on gameplay data of one or more players without reference to gameplay data of a first player, and the generic player behavior model is a machine learning model comprising a plurality of layers; obtain gameplay data for the first player, where the gameplay data identifies in-game actions performed by the first player in each of a plurality of game states in a video game; designate at least a subset of the plurality of layers in the generic player behavior model as frozen layers to be used in a custom model associated with the first player; generate one or more custom layers for the custom model based on the gameplay data for the first player, where the one or more custom layers rely at least in part on the frozen layers of the generic player behavior model in order to predict in-game actions that would be performed by the first player in at least one or more game states; and store a trained custom model associated with the first player, where the trained custom model includes the one or more custom layers and further includes or relies on the frozen layers of the generic player behavior model, where the trained custom model is configured to receive data regarding a game state of the video game as input and to output an automated action to be performed in the video game.

The computer system above can have one, all, or any combination of the following features. The computing system may be one of a video game console system, a mobile phone, a tablet device, or a personal computer. The computing system may have sufficient processing capabilities to train the one or more custom layers but insufficient processing capabilities to fully train a model having a level of complexity of the generic player behavior model. Use of the frozen layers in the trained custom model may enable the trained custom model to determine an automated action to output when provided with an input game state that does not appear in the gameplay data for the first player. The generic player behavior model may be a first deep neural network, where the trained custom model is a second deep neural network that includes more layers than the first deep neural network. A majority of layers in the second deep neural network may be frozen layers from the first deep neural network, and the one or more custom layers may include a new output layer that differs from an original output layer of the first deep neural network. The computing system may be further configured to provide at least the one or more custom layers of the custom model associated with the first player to a second computing system of a second player in order for a game application operating on the second computing system to imitate gameplay of the first player.

In some embodiments, a computer-implemented method may include, under the control of a computer system comprising computer hardware, the computer system configured with computer executable instructions: obtaining a generic player behavior model, where the generic player behavior model is trained based on gameplay data of a plurality of players of a video game, where the generic player behavior model is configured to provide an indication of an in-game action to be performed in each of a plurality of gameplay situations; obtaining gameplay data for a first player, where the gameplay data identifies in-game actions performed by the first player in each of a plurality of game states in the video game, where the first player is not one of the plurality of players associated with training of the generic player behavior model; incorporating a plurality of portions of the generic player behavior model into a custom model associated with the first player, where the plurality of portions each comprise a layer or a level in the generic player behavior model; generating one or more custom portions for the custom model based on the gameplay data for the first player, where generating the one or more custom portions includes training the custom model to predict in-game actions that would be performed by the first player in particular game states, and where the training includes repeatedly updating the one or more custom portions without changing the plurality of portions of the generic player behavior model incorporated into the custom model; and storing the custom model after the training as a trained custom model associated with the first player, where the trained custom model includes the one or more custom portions and further includes or relies on the plurality of portions of the generic player behavior model, where the trained custom model is configured to receive data regarding a game state of the video game as input and to output an automated action to be performed in the video game.

The above computer-implemented method may further include one, all, or any combination of the following features. The generic player behavior model may be a deep neural network, and each of the plurality of portions of the generic player behavior model may be a different layer in the deep neural network. The generic player behavior model may be a stackable model, where each of the plurality of portions of the generic player behavior model is a different level in the stackable model. The trained custom model may be configured to, in a given instance of the trained custom model being provided a first game state as input: determine whether a level in the one or more custom portions is able to predict a first automated action associated with the first game state with at least a threshold confidence; and based on the level in the one or more custom portions predicting the first automated action with the least a threshold confidence, causing the first automated action to be performed in the video game without considering any portions of the generic player behavior model in the given instance.

In other embodiments, the above method may include updating the one or more custom portions for the custom model based on a discriminator trained using generative adversarial imitation learning to reward output of the custom model that appears to the discriminator to be an action of the first player. In another embodiment, the method may include: receiving a selection by a second player of a character in the video game to behave in an instance of the video game as though the character is under control of the first player; and in response to the selection, causing the character to perform actions within the instance of the video game that are determined by the custom model associated with the first player.

In some embodiments, a non-transitory computer-readable storage medium may have stored thereon computer-readable instructions that, when executed, configure a computing system to perform operations. The operations may include: obtaining a generic player behavior model, where the generic player behavior model is configured to provide an indication of an in-game action to be performed in each of a plurality of gameplay situations in a video game; obtaining gameplay data for a first player, where the gameplay data identifies in-game actions performed by the first player in each of a plurality of game states in the video game; incorporating a plurality of portions of the generic player behavior model into a custom model associated with the first player, where the plurality of portions each comprise a layer or a level in the generic player behavior model; generating one or more custom portions for the custom model based on the gameplay data for the first player, where generating the one or more custom portions includes training the custom model to predict in-game actions that would be performed by the first player in particular game states, where the training does not alter at least a subset of the plurality of portions of the generic player behavior model incorporated into the custom model; and storing the custom model after the training as a trained custom model associated with the first player, where the trained custom model includes the one or more custom portions and further includes or relies on the plurality of portions of the generic player behavior model, where the trained custom model is configured to receive data regarding a game state of the video game as input and to output an automated action to be performed in the video game The computer-readable medium above may further include one, all, or any combination of the following features. The operations may further comprise generating a plurality of custom models each configured to imitate gameplay of a different player, where each of the plurality of custom models include the same portions of the generic player behavior model as each other. The operations may further comprise tracking character success in the video game of characters controlled by each of the plurality of custom models in gameplay against actual player competitors. The operations may further comprise generating a ranking of models among the plurality of custom models, where the ranking indicates relative in-game success of each of at least a subset of the models in actual gameplay. The operations may further comprise executing a training environment within the video game, where the training environment presents simplified game states for player interaction, and where training data for generating the one or more custom portions for the custom model is collected based on control input received from the first player with the training environment. The complexity of game states presented within the training environment may increase over time. The trained custom model may comprise at least one of a decision tree, a Markov model, or a deep neural network.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION

Overview

Figure 1:
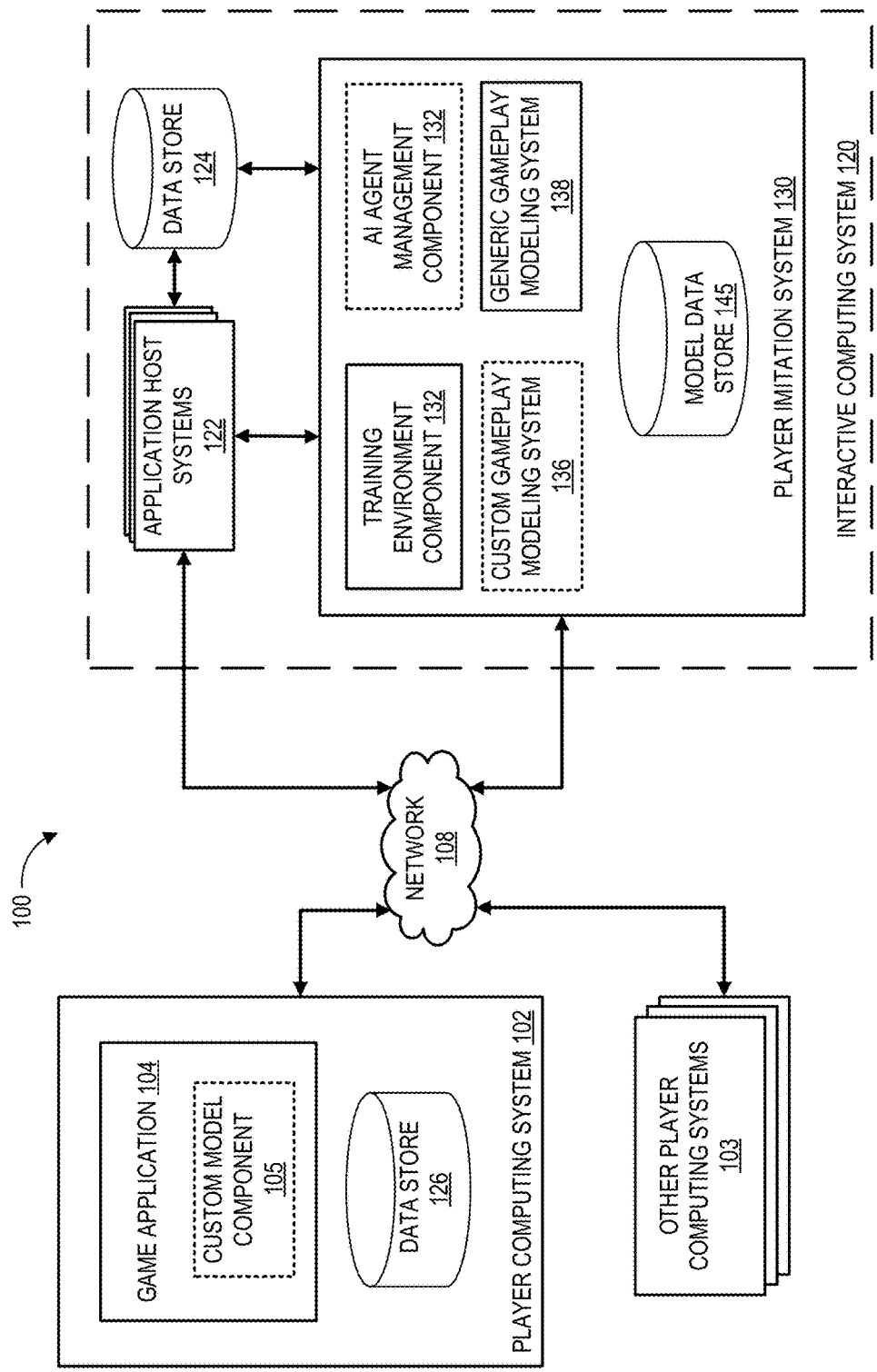
FIG. 1 illustrates an embodiment of a networked computing environment for implementing one or more embodiments of a player imitation system that enables training and use of player-specific custom behavior models.

Aspects of the present disclosure relate to training a machine learning model or AI agent to control an in-game character or other entity in a video game in a manner that aims to imitate how a particular player would control the character or entity. Training such a customized behavior model that believably imitates a certain player's gameplay is difficult without having a large amount of diverse gameplay data for that particular player covering the potentially very large number of unique game states that may be encountered within a given video game. Furthermore, training such a model using alternative techniques than those described herein may require computer processing capabilities beyond the typical game player's computing system, which would often be a client-side gaming console system, personal computer, smartphone or other player device. Aspects of the present disclosure provide model training solutions that may result in many different fully trained custom behavior models that each mimic or imitate play of a different player with less time required of the player (such as during collection of training data for the particular player) and less computer processing time required than many alternative approaches to custom behavior model development.

For example, according to one embodiment, a comprehensive, generic player behavior model or AI agent may be trained in a potentially computationally expensive training process on a large set of training data, such as gameplay data recorded across many different players' playing sessions for a particular video game. At least some portions of this generic model may then be frozen, such that the information in those portions (such as particular rules, weights, and/or other data depending on the type of model) will not be altered or corrupted during a subsequent personalization phase or particular end-user training process. Additional layers or levels may then be trained with reference to a particular player's gameplay data to customize the generic model to emulate behavior of the particular player rather than play of a generic or typical player. The approaches described herein may enable generation of a customized player-specific behavior model in a manner where the customized model is initially usable with relatively little personal training data for a particular player (such as by relying on generic behavior for game states not yet observed in the personalized training data), but which converges towards behavior of the particular player during further observation of the player's gameplay. Furthermore, training of these incremental or additional layers or levels, as described herein, may occur entirely on a client device (such as a player's gaming console system or personal computer), in some embodiments.

The player-customized models described herein may be used to control an in-game character or entity as a non-player character (NPC). An NPC under control of a customized behavior model as described herein may behave in a video game in a manner that emulates or mimics play of a particular actual player. According to aspects of the present disclosure, a model for a specific player may be dynamically constructed during one or more gameplay sessions based on a learning process that analyzes the player's control commands or actions taken in response to various game states. When a player imitation system as described herein determines that it should control a particular character in a given game instance, such as at that player or another player's request, a trained player imitation model may be used by the player imitation system to emulate controls or actions based on the current game state that appear to that player and/or other players to be controls or actions that the given player (on which the particular model was trained or personalized) would make if he were controlling the given character.

As used herein, a game state may generally refer to data regarding the state of a game at a given snapshot instant, and may include different information depending on the type of game and manner in which the game's environment is represented in computer memory. Game state information can include game data such as character states, character actions, environment states, positional information about objects and/or characters in the game, non-positional information about characters and/or objects in the game, speeds, directions, health and other attributes, game modes, levels, and/or other information associated with a runtime state of a game application. For example, game state information may include, for each of potentially many virtual characters interacting in a virtual world (such as both player-controlled characters and NPCs), a character position, character orientation, current character action, attributes, and/or other information contributing to a state of a game application. The game state information can include dynamic state information that continually changes, such as character movement positions, and static state information, such as the identification of a game level or map within the game. In some embodiments, at least a portion of the game state information can be updated on a periodic basis, such as multiple times per second. In some embodiments, the game state information can be updated on an event-based basis. In some embodiments, game state information may be maintained asynchronously between individual player computing systems and a server that periodically sends updates to the player computing systems regarding game state information reflecting in-game actions of the various other players.

Overview of Player Imitation System and Operating Environment

FIG. 1 illustrates an embodiment of a networked computing environment 100 for implementing one or more embodiments of a player imitation system that enables training and use of player-specific custom behavior models. The environment 100 includes a network 108, a player computing system 102, one or more other player computing systems 103, and an interactive computing system 120. To simplify discussion and not to limit the present disclosure, FIG. 1 illustrates only one interactive computing system 120, though multiple systems may be used.

The interactive computing system 120 can include application host systems 122, one or more data stores 124, and a player imitation system 130. The player imitation system 130 can communicate with data store 124 and/or with the application host systems 122 to acquire data associated with a game application, train gameplay behavior models, and provide automated game control within a game application, as discussed herein. The player imitation system 130 can additionally or alternatively communicate with player computing system 102 and/or one or more other player computing systems 103 through the network 108. Although only one network 108 is illustrated, multiple distinct and/or distributed networks may exist. The various systems and other components illustrated in FIG. 1, including interactions or communications between them, will now be described in more detail below.

A. Interactive Computing System

In the illustrated embodiment, the interactive computing system 120 includes application host systems 122, a data store 124, and a player imitation system 130. These systems may communicate with each other. For example, the player imitation system 130 may communicate with the application host system 122 in collecting training data to train a generic and/or custom model for imitating player behavior. In some embodiments, the player imitation system 130 can obtain data associated with a game application (such as game state information) from one or more of the application host systems 122 and can provide emulated control data to one or more application host systems 122. The application host systems 122 can communicate with the data store 124 to execute and/or host a game application. In certain embodiments, the interactive computing system 120 may be considered a game server that provides network-based support for single player or multiplayer video games played by players utilizing various player computing systems, such as player computing systems 102 and 103.

1. Application Host Systems

The application host systems 122 can be configured to execute a portion of the game application 104 operating on the player computing system 102 and/or a host application (not illustrated) on the interactive computing system 120. In certain embodiments, the application host systems 122 may execute another application instead of or in addition to executing a portion of the game application 104 and/or a host application, which may complement and/or interact with the game application 104 during execution of a gameplay session of the game application 104. An instance of a game that is executed based at least in part on an application host system interacting with one or more game applications on player computing systems may be referred to herein as a hosted instance of a game. Further details regarding application host systems are described below.

The interactive computing system 120 may enable multiple players or computing systems to access a portion of the game application 104 and/or a host application. In some embodiments, the portion of the game application 104 executed by application host systems 122 of the interactive computing system 120 may create a persistent virtual world. This persistent virtual world or virtual environment may enable one or more players to interact with the virtual world and with each other in a synchronous and/or asynchronous manner. In some cases, multiple instances of the persistent virtual world may be created or hosted by the interactive computing system 120. A set of players may be assigned to or may access one instance of the persistent virtual world while another set of players may be assigned to or may access another instance of the persistent virtual world. In some games, a set of players may cooperatively interact with each other within the same instance of a virtual world, such as being placed on the same team within an instance of a sports video game or being grouped together in a match, mission, quest, campaign or other cooperative mode in any of various types or genres of games.

In some embodiments, the application host systems 122 may execute a hosting system for executing various aspects of a game environment. For example, in one embodiment, the game application 104 may be a competitive game, such as a first person shooter or sports game, and the host application system 122 can provide a dedicated hosting service for hosting multiplayer game instances or facilitate the creation of game instances hosted by player computing devices. The in-game interactions between players within a game instance may vary widely depending on the type of game being played. For example, in one game a group of players may cooperatively work together to build a virtual city, while in another game, players may be placed into competitive sides that attempt to shoot each other in a combat simulation. Aspects of the present disclosure may provide benefits in nearly any genre of video game, such as shooter games (such as first person or third person shooters), survival games, adventure games, sports games, platform games, role playing games, simulation games, strategy games, racing games, etc.

2. Player Imitation System

As will be described in further detail herein, the player imitation system 130 can communicate with other systems to generate a generic player behavior model, generate custom player gameplay models for one or more specific players, and emulate controls of a player using a configured player imitation model. The player imitation system 130 can include one or more systems, subsystems or components for implementing various functionality described herein. For example, the player imitation system 130 can include a training environment component 132, an AI agent management component 132, a custom gameplay modeling system 136, and a generic gameplay modeling system 138. These example systems or components are not intended to be limiting, and the player imitation system 130 may include fewer or more systems or components than illustrated or described.

The training environment component 132 may generate instances of a training environment within a video game, which may be presented to a player of the player computing system 102 for interaction during a training phase for a player imitation model for a given game. As will be further described below, the training environment may present simplified game states and/or progressively more complicated game states to employ a curriculum learning approach to training the model. A player's entered control commands and/or the associated in-game actions while interacting or playing within the training environments generated by the training environment component 132 may be recorded and stored for model training.

The generic gameplay modeling system 138 and the custom gameplay modeling system 136 may be responsible for generating generic and personalized player behavior models, respectively. Functionality provided by the gameplay modeling systems 136 and 138 will be described in more detail below. The AI agent management component 132 may perform various management, ranking, scoring, tracking and other features associated with custom or personalized player behavior models or AI agents. For example, the AI agent management component 132 may track the success (such as win rates and various in-game statistics) of different AI agents in games across a number of player computing systems, enable players to search or browse AI agents to play against or cooperatively with, and/or other features related to the use of one player's custom model across game instances of other players.

The player imitation system 130 and its various systems or components may be distributed across multiple computing systems. The various systems of the player imitation system 130 can communicate with each other to obtain, analyze and generate data. While various systems are illustrated as part of the interactive computing system 120 and/or player imitation system 130, it will be appreciated that each system's functionality could be implemented by a different or multiple computing systems or devices. Furthermore, a single system could implement functionality described herein as being provided or implemented by multiple systems in communication with each other. Similarly, functionality described as being provided by the player imitation system 130 of the interactive computing system 120 could instead be implemented at a player computing system 102, in other embodiments.

The player imitation system 130 can include a model data store 145. The data store 145 can be configured to store generic and/or custom player imitation models or behavior models, such as models trained to receive a game state as input and to output a predicted action or control command that a real player would make given the game state. Player imitation models will be described in more detail below, and may include one or more generic models and one or more player-specific models. The data store 145 may be distributed across multiple computing devices (see for example computing device 10 in FIG. 6). In some embodiments, the data store 145 may be a network-based storage system where data may be stored in different locations.

3. Data Store of Interactive Computing System

The interactive computing system 120 can include a data store 124. The data store 124 can be configured to store data acquired by other systems, such as, for example, telemetry data, video data, game state information, user data, or the like. In some embodiments, the data store 124 may store user account data associated with a video game publisher, a game platform provider or other service that enables a user to maintain preferences, virtual characters, avatars, achievements, and/or other data across a plurality of different video games. For example, account identifier data stored in data store 124 may be used by the player imitation system 130 to associate stored player imitation models with particular players' accounts. The data store 124 may be distributed across multiple computing devices (see for example computing device 10 in FIG. 6). In some embodiments, the data store 124 may be network-based storage system where data may be stored in different locations.

A. Player Computing Systems

Each of the player computing system 102 and the other player computing systems 103 can be controlled by a different user, such as different players of a video game. The player computing system 102 may include hardware and software components for establishing communications over a communication network 108. For example, the player computing system 102 may be equipped with networking equipment and network software applications (for example, a web browser) that facilitates communications via one or more networks (for example, the Internet or an intranet). The player computing system 102 may have varied local computing resources such as central processing units and architectures, memory, mass storage, graphics processing units, communication network availability and bandwidth, and so forth. Further, the player computing system 102 may include any type of computing system. For example, the player computing system 102 may include any type of computing device(s), such as desktops, laptops, game application platforms, game console systems, virtual reality systems, augmented reality systems, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few.

In some embodiments, the player computing system 102 may include one or more of the components or embodiments described below. In some embodiments, individual other player computing systems 103 may include similar components as the player computing system 102, though may also have differences (e.g., one player may play a given game from a mobile device while another player may play the same game on a desktop computer or game console system).

1. Game Application(s) and Host Application System

The player computing system 102 and each of the other player computing systems 103 may be capable of executing one or more game applications 104, which may be stored and/or executed locally and/or in a distributed environment. In a locally executed game application 104, generally, the game does not rely or utilize an external computing system (for example, the interactive computing system 120) to execute the game application. In some instances, a locally executable game can communicate with an external server to retrieve information associated with the game, such as game patches, game authentication, clouds saves, custom virtual character data, user account data, or other features. In distributed game applications, the player computing system 102 may execute a portion of a game and the interactive computing system 120, or an application host system 122 of the interactive computing system 120 may execute another portion of the game. For instance, the game may be a massively multiplayer online role-playing game (MMORPG) that includes a client portion executed by each of the player computing systems 102 and 103, and a server portion executed by one or more application host systems 122. For the present discussion, the type of game application 104 can be a locally executable game, a distributed application, or an application that includes a portion that executes on the player computing system 102 and a portion that executes on at least one of the application host systems 122.

2. Custom Model Component

The player computing system 102 and other player computing systems 103 may include a custom model component 105. The custom model component 105 is illustrated in FIG. 1 as being a part of the game application 104, but may be included in a separate application, plug-in, or other form, in other embodiments. The custom model component 105 may be responsible for training the custom layers or levels of a behavior model based on a local player's in-game behavior. The custom model component 105 at the player computing system 102 and the custom gameplay modeling system 136 of the player imitation system 130 may provide similar functionality, such that only one of them is used in a given instance or even present in a given embodiment. For example, instances where training of a custom model will take place on the client side (such as at player computing system 102) may include employing the custom model component 105, while training of a custom model on the server side may involve employing the custom gameplay modeling system 136.

3. Player Data Store

The player computing system 102 can include a data store 126. The data store 126 can be configured to store data associated with one or more game applications 104, local account data associated with an account maintained for the player by the interactive computing system 120, gameplay history data, and/or other game-related or account-related data. In some embodiments, the data store 126 may optionally store local copies of a custom player imitation model data for the particular player to enable the player to locally play against a previous version of himself, auto-play a portion of a single player game, and/or for other use in the absence of a network connection to the interactive computing system 120. The data store 126 may additionally include storage of a pre-trained generic player behavior model (which may have been originally generated by the player imitation system 130), which may be relied upon or referenced by one or more custom models. The data store 126 may additionally store other players' custom behavior models, such as models that enable the particular player to play against or cooperatively with an NPC that behaves like a particular friend of the player or a well-known player. The data store 126 may be distributed across multiple computing devices (see for example computing device 10 in FIG. 6).

B. Other Considerations

Although the various systems are described separately above, it should be noted that one or more of these systems may be combined together. For example, one or more of the systems may be executed by the same computing device (see for example, computing device 10 in FIG. 6) or by a different computing system than illustrated in FIG. 1. In some embodiments, the player imitation system 130 may be executed on the same computing device as the player computing system 102. On the other hand, one or more systems may be executed by multiple computing devices. For example, a portion or subsystem of the player imitation system 130 may be implemented by the player computing system 102 while another portion or subsystem may be implemented by a server.

Example Data Flow within Illustrative Operating Environment

Figure 2:
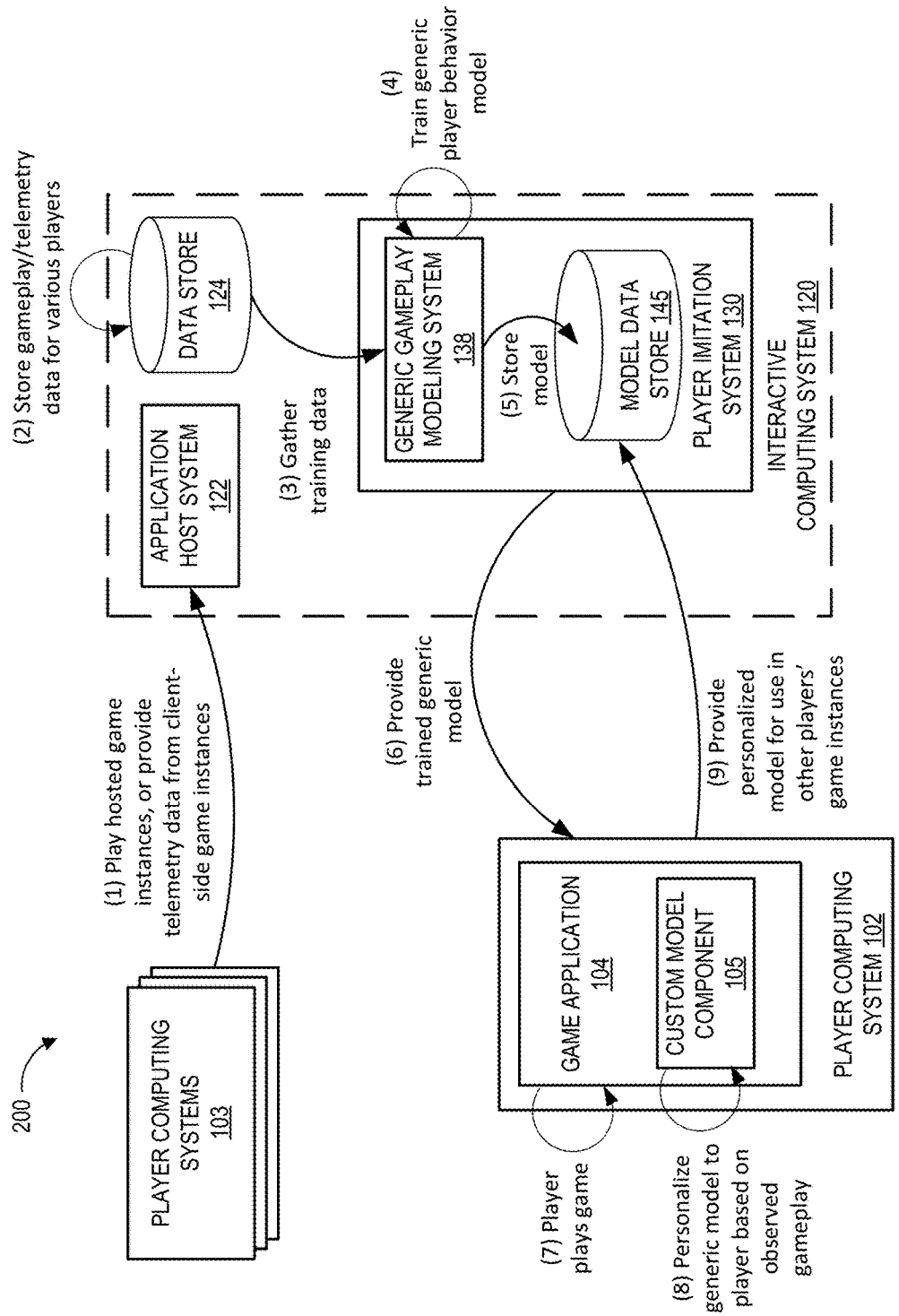
FIG. 2 illustrates example data flow within the networked computing environment of FIG. 1.

FIG. 2 illustrates example data flow within the networked computing environment of FIG. 1. For ease of illustration, the data flow of FIG. 2 does not specify whether individual communications between illustrated components or systems are over a network or are local within a single computing system or device. While one example network arrangement is illustrated in FIG. 1 and described above, it will be appreciated that components or subsystems illustrated as part of a single computing system in FIG. 1 (such as the systems and components of player imitation system 130) may instead be remotely located relative to each other. Similarly, other systems illustrated as in network communication with each other in FIG. 1 (such as player computing system 102 and player imitation system 130) may in some embodiments be operated together on a single computing system or may be in direct local communication with each other rather than communicating over a network.

As illustrated in FIG. 2, at step (1), players utilizing at least some of the player computing systems 103 may play one or more hosted games via the application host 122, which includes the application host system 122 receiving indication in real time of in-game actions or control commands entered by the players while playing the hosted game instances. Alternatively or additionally at step (1), at least some of the player computing systems 103 may provide telemetry data to the interactive computing system 120 regarding previous or recent gameplay sessions at the respective player computing systems. For example, game applications or associated software operating on the player computing systems 103 may be configured by an operator of the interactive computing system 120 to record certain user gameplay data (such as in-game actions performed by the player, along with corresponding game state data) locally at individual player computing systems, then upload or otherwise provide the gameplay data and/or other telemetry data to the interactive computing system 120, such as in a batch process.

An individual player utilizing one of player computing systems 103 may be playing an online multiplayer game application that is configured to communicate with the application host system 122 to receive shared game state information that is affected in real time by other player computing systems 103 that are executing their own copies of the game application. Thus, the application host system 122 may enable other players in the multiplayer game to interact with the same instance of a virtual world as the player utilizing player computing system 102, and may continually update the current shared game state among the different player computing systems to reflect each of the players' interactions (as well as programmatic environment changes, NPC actions, etc.).

The player control commands can include, for example, directional inputs along a first axis (such as up/down) or provided to a first joystick (such as a left joystick), second directional inputs provided along a second axis (such as left/right) or provided to a second joystick (such as a right joystick), whether buttons (such as A, B, X, Y, Z, left bumper, right bumper, start, select, turbo, mouse clicks, finger taps, and the like) are pressed to cause a unit or character in the video game to perform an assigned action, and/or other input data. The player control commands can be provided through any of a variety of input devices and input formats, such as through a controller, through a mouse and keyboard, through voice commands, through a touchscreen, by gesture, and the like. In other embodiments, the actual button presses, mouse clicks, gestures or other information may be processed by the game application locally at the respective player computing system and translated into an in-game action (e.g., a virtual character firing a gun or turning 90 degrees left, a player selecting to deploy troops at certain in-game map coordinates, etc.), where this in-game action or other result of the player input is provided as the player control command(s) to the application host system.

The interactive computing system 120 may store various gameplay and/or telemetry data received or collected for the various players in the data store 124, at step (2). In some embodiments, this may include storing telemetry data or game interaction data for each of many thousands of game instances across hundreds or even thousands of different players. Next, at step (3), all or a subset of the gameplay data stored in data store 124 may be selected as training data for training a generic gameplay model. For example, in embodiments in which the generic model is intended to imitate gameplay of an average player, a group of average or near average (such as within a certain percentage threshold below or above average) players' actual gameplay history may be selected as training data (where the average could be with reference to win rates or any other in-game metrics or statistics tracked for players). In other embodiments, the training data selected may be recorded from particular players' game sessions, such as expert players who played the game specifically for purposes of training a generic model, such as by purposely attempting to play at an appropriate skill level desired of the trained generic behavior model.

Next, at step (4) the generic gameplay modeling system 138 may train a generic player behavior model based on the selected training data. Depending on the embodiment, the type of model or algorithm employed for the generic player behavior model may vary. For example, the model may include one or more decision trees, Markov models, convolutional neural networks, deep neural networks, various apprenticeship learning algorithms, inverse reinforcement learning algorithms, adversarial networks (such as generative adversarial imitation learning), and/or other methods of modeling behavior based on observed behavior of players. The generic model may generally be trained to learn the control commands or in-game actions that players tend to take in various game situations or game states. Thus, as a result of the training, the model may be configured to predict an in-game action that a real player is likely to perform in a given game state.

For example, in a basketball video game, the generic model may learn, through the training process, the game states in which typical players tend to enter control commands for an in-game virtual character to pass the ball, shoot the ball, run in specific directions, perform special moves, jump to block a shot, sprint, etc. In this example, relevant game state information that may be taken into account by the model may include data such as where teammates and an opposing team's characters are positioned (both on the virtual court and relative to each other), the time remaining in a quarter and/or the game, a current score difference between the teams, time remaining on a shot clock, fouls remaining, etc. Examples for capturing game state information, including relative positioning of characters in a virtual world, as well as training a machine learning model to emulate a human player, is described in U.S. patent application Ser. No. 15/985,347, filed May 21, 2018 and entitled "ARTIFICIAL INTELLIGENCE FOR EMULATING HUMAN PLAYSTYLES," which is hereby incorporated by reference in its entirety herein.

Once a generic player behavior model has been generated, the model may be stored at step (5) in the model data store 145. At or before a time when a particular player (utilizing player computing system 102 in this example) desires to train a custom behavior model at some later point in time, the trained generic model may be retrieved from the model data store 145 and provided from the player imitation system 130 to the player computing system 102, at step (6). The game application 104 may then be configured to customize the generic model for the particular player based in part on use of a custom model component 105 included within the game application 104 or otherwise executed by the player computing system 102 in conjunction with execution of the game application. The customization or personalization of the generic model may include freezing or otherwise preventing corruption or change of at least some of the layers or levels of the generic model, while building additional layers or levels that reflect deviation of the observed play of the particular player from the behavior captured in the generic model. Generation of these custom layers or levels will be further described below with reference to FIGS. 3-5.

The custom layers or levels generated to capture the particular player's unique play behavior may be stored locally at the player computing system 102, and/or may be provided to the player imitation system 130 for storage at step (9). For example, in some embodiments, the model data store 145 may store a large number of different trained custom models that have each been trained with respect to different players' observed gameplay. In some embodiments, a player may be able to share the model(s) that he trained with other players so that the other players' may play against a virtual version of him (e.g., against an NPC that behaves similarly to how the given player would control that character). In some embodiments, the player imitations system 130 may track the character success within a video game of characters controlled by each of the plurality of custom models in gameplay against actual player competitors, and may generate a ranking of AI agents or associated models based on the models' in-game success or performance.

A given personalized, trained model may be used for a variety of purposes. For example, the model may be used to automatically take over control of a character previously controller by a player who loses a network connection or other control capabilities mid-game, as further described in U.S. patent application Ser. No. 16/367,139, filed Mar. 27, 2019 and entitled "AUTOMATED PLAYER CONTROL TAKEOVER IN A VIDEO GAME," which is hereby incorporated by reference in its entirety herein. Additionally or alternatively, the trained model may be selected as an AI agent by a player to play against herself (e.g., by loading her own previously trained model to practice against an NPC opponent that behaves similarly to her prior training data) or with herself (e.g., by loading a custom trained model of hers to control one of her NPC teammates in a game instance). In some embodiments, a player can make her custom models shareable with other players, which may provide a way to practice against champions or particularly skilled players as they performed in the past or currently perform, or to enable a virtual version of a player to play in a tournament or match with or against friends in the player's absence.

While FIG. 2 has been described with reference to embodiments in which the player computing system 102 executes the game application 104 locally and personalizes the generic model by implementing the custom model component 105 locally at the player computing system, in other embodiments the player training a custom model utilizing the player computing system 102 may play a hosted instance of the game. For example, the training data for the custom model development may be collected via the application host system 122, and the custom layers of the model may be generated by the custom gameplay modeling system 136 of the player imitation system 130.

Illustrative Methods for Generating Custom Behavior Models

Figure 3:
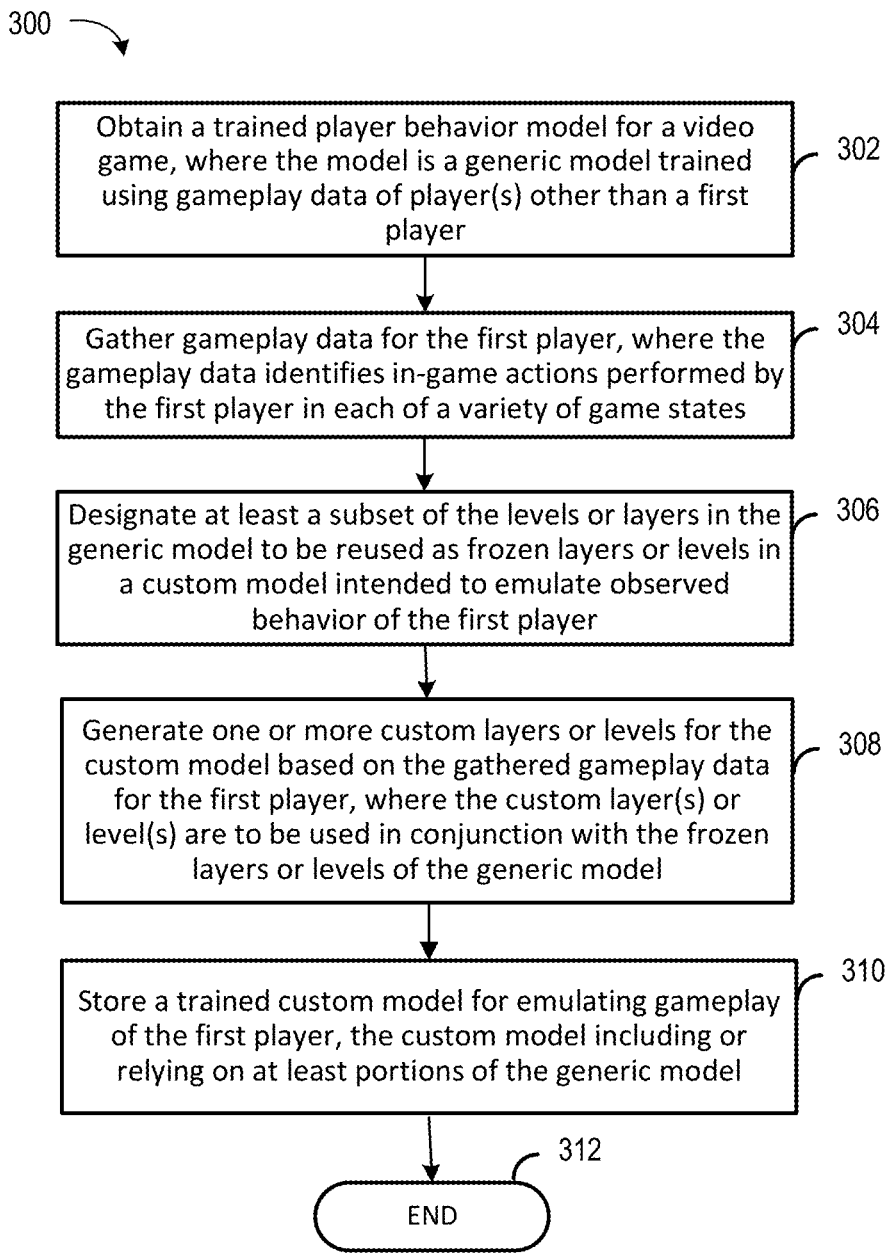
FIG. 3 is a flow diagram of an illustrative method for generating a custom player behavior model for imitating in-game behavior of a particular player, according to some embodiments.

FIG. 3 is a flow diagram of an illustrative method 300 for generating a custom player behavior model for imitating in-game behavior of a particular player, according to some embodiments. In some embodiments, the method 300, in whole or in part, can be implemented by a game application 104, a player imitation system 130, a player computing system 102, an interactive computing system 120, or other application component or module. Although any number of systems, in whole or in part, can implement the method 300, to simplify discussion, the method 300 will be described with respect to particular components of the player computing system 102, such as custom model component 105. In other embodiments, a similar method may be implemented by the player imitation system 130, such as by the custom gameplay modeling system 136.

The illustrative method 300 begins at block 302, where the custom model component 105 may obtain a fully trained player behavior model for a video game, where the model is a generic model trained using gameplay data of one or more player(s) other than a first player. As previously described above with respect to FIG. 2, the generic model may be received from the player imitation system 130, which may have trained the generic model using a large amount of historical player behavior data to learn how to control an in-game character in a manner that believably mimics or emulates a generic or average quality player (or any other desired skill level of player, depending on the training data selected). As discussed elsewhere herein, the pre-trained generic model may be of various types, including rule-based stackable levels, decision trees, deep neural networks, Markov models, and/or others.

At block 304, the custom model component 105 may gather gameplay data for the first player, where the gameplay data identifies in-game actions performed by the first player in each of a variety of game states. In some embodiments, the gathered gameplay data may generally include records of specific in-game actions that the player caused a player-controlled character in the game to take in specific game states (e.g., the player caused a character in a basketball game to make a three point jump shot attempt from a certain position on the virtual court, when other characters were at certain positions in the environment, with a certain time remaining in the game and a certain score), and/or actual control commands entered by the player (e.g., the player pressed the 'A' button on a game controller at a certain time, during a particular game state). The gameplay data gathered may include gameplay data recorded while the player plays a video game normally (e.g., not in a specific in-game training environment), and/or may include gameplay data collected in a virtual training environment in the game that is designed by a game developer to improve the quality of training data for the custom model relative to gameplay data recorded in normal gameplay.

In embodiment in which a training environment is provided for player interaction with the video game, the game application 104 may generate instances of a training environment that are presented to a player of the player computing system 102 for interaction during a training phase of custom model development for the particular player. The training environment may present simplified game states designed to collect training data based on the player control inputs or commands while playing within the training environment. For example, in a basketball video game in which the typical in-game environment includes ten in-game characters (e.g., a five versus five game including five characters on each of two teams), the training environment may present a simplified or sandbox state in which the only characters present are a player-controlled character and a single AI-controlled or NPC teammate.

Once training data has been observed in the first simplified game state, the training environment may gradually present increasingly complex game states for player interaction, such as moving from one versus one, to two versus two, to three versus three, and/or other simplified states before presenting a typical game state (such as five versus five). The game states presented may include drills or other scenarios where the player is tasked with performing certain actions. Accordingly, the training may take advantage of curriculum learning approaches in machine learning that allow for training a model to learn simple tasks before learning more complex tasks.

At block 306, which may occur before or after gathering the gameplay data at block 304, the custom model component 105 may designate at least a subset of the levels or layers in the generic model to be reused as frozen layers or levels in a custom model intended to emulate observed behavior of the first player. Freezing particular layers or levels, as used herein, may refer to reusing the given levels or layers of an existing model in a new model to be trained, but designating those reused levels or layers as static or immutable in the training process for the new model. For example, in a neural network, freezing a layer may include designating a layer of nodes, their incoming connections from a prior layer, and their associated weights as fixed or locked during subsequent training. As another example, for a rule-based model, which may include stackable models, decision trees or other structures, freezing a level may include designating a particular rule, weights and/or logic included within a given level as immutable (for example, the rule cannot be deleted or removed from the model, although a new custom level and associated rule may eventually take precedence over the frozen level, as will be discussed below).

As will be discussed below with respect to FIGS. 4 and 5, the specific layers or levels of the generic model that are designated as frozen or otherwise reused in the custom model may vary depending on the type of modeling used in a given embodiment. For example, in some instances in which the generic model is a deep neural network, all but the final layer of nodes or neurons of the generic model may be reused and frozen for the custom model training. In another embodiment, such as with respect to a stackable model discussed below, the frozen levels designated from reuse in the custom model may include the entire generic model.

At block 308, the custom model component 105 may generate one or more custom layers or levels for the custom model based on the gathered gameplay data for the first player, where the custom layer(s) or level(s) are to be used in conjunction with the frozen layers or levels of the generic model. As will be discussed below with respect to FIGS. 4 and 5, the new layers or levels for the custom model may take different forms and have different relative positions or precedence relative to the frozen generic layers or levels, depending on the embodiment and model type. For example, one or more new output layers may be added to a deep neural network, such that the new layer(s) have incoming connections from nodes of the last frozen layer of the generic model (which may be considered a "postfix" embodiment). In other embodiments, such as stackable models described below, one or more new levels may be generated and added prior to or with precedence over the generic levels (which may be considered a "prefix" embodiment).

Training of the custom model may generally include providing the training input data observed from the player (gathered above at block 304) to the initial custom model (which may initially include the frozen layers or levels, along with one or more untrained layers or levels to be modified in the training process) and employing and of a variety of machine learning approaches, depending on the form of the model and the embodiment. The input training data, in some embodiments, may include features associated with the game state at each of a number of snapshot moments during gameplay, along with an indication of an in-game action or control command entered by the player at each of those moments. In the example of a deep neural network, the training data may gradually adjust connections and weights associated with the newly added custom layers, while the earlier frozen layers from the generic model remain unchanged. In some embodiments, training the custom model may include employing reward maximization techniques, such as using generative adversarial imitation learning (GAIL) to reward behavior of the custom behavior model that a discriminator trained within the GAIL modeling labels as an action of the player (as opposed to an artificial action of an AI character). In other embodiments, other forms of reinforcement learning may be used to improve the custom model.

In some embodiments, training the custom model may include updating a Markov model to reflect updated player behavior statistics for a given game state or similar game states. For example, the model may be updated in view of particular input training data to reflect a higher likelihood than previously that the player will perform the given action or command in similar future game states (e.g., likelihood of jumping to block a shot when on defense and standing within a certain distance of a shooter on a certain portion of the court). Different models or model types may have various levels of quantization, rounding or abstraction applied to the game state for which rules are stored and/or provided as training data. For example, a game state may be identified in the model very broadly such as "have the ball with one second left on game clock," or much more specifically such as "on defense, guarding an opponent who has the ball, with five fouls, team leading by more than 5 points, standing near half court," etc.

At block 310, once at least an initial training of the custom model has occurred, the custom model component 105 may store a trained custom model for emulating gameplay of the first player, where the custom model includes or relies on the frozen layers or levels of the generic model. Because the frozen layers should retain important behavior learned in training the generic model, the custom model may be usable early on in training without the model encountering unknown game states or otherwise selecting unusual in-game actions due to lack of custom training data. Thus, while the custom model may slowly converge more toward behaving like the specific player over a longer training period, the training may occur incrementally over time without needing to reach a particular threshold before being suitable for actual in-game use to control an NPC.

In some embodiments, only the custom layers or level are stored at block 310, with a reference or an association to the generic model that the custom layers or level build on, such that multiple custom models may be stored with reference to the same generic model without repeatedly storing the same frozen generic layers or levels across the different models. In other embodiments, the custom model may be stored as a single complete model, including the frozen layers or levels from the generic model. Once the custom model is stored locally and/or provided back to another system, such as for remote storage in the model data store 145, the illustrative method 300 ends at block 312.

Example Multi-Layered Imitation Models

Figure 4:
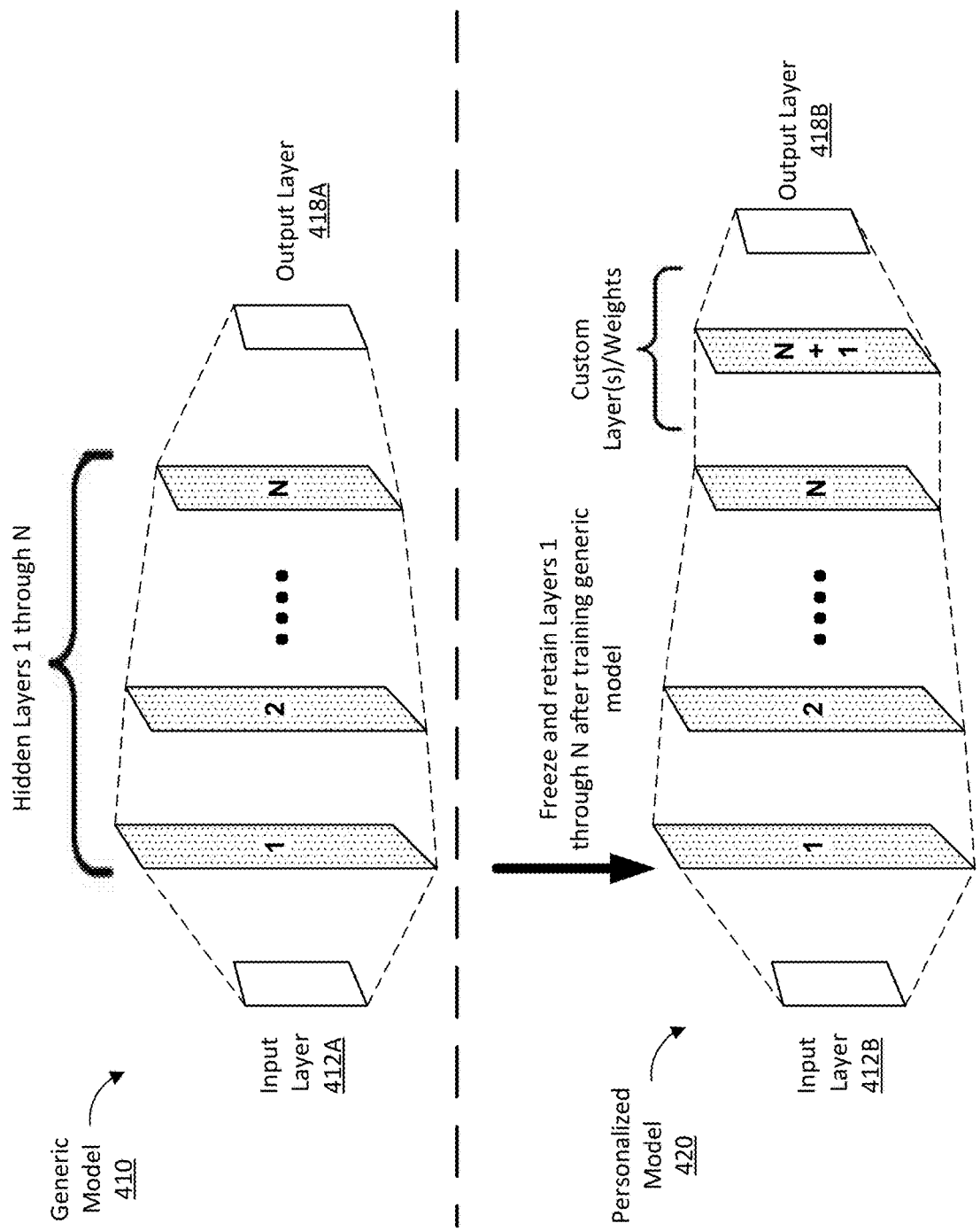
FIG. 4 provides an illustrative visual representation of a multi-layered machine learning model trained to imitate a generic player, as well as a corresponding personalized multi-layered machine learning model trained to imitate a particular player.

FIG. 4 provides an illustrative visual representation of a multi-layered machine learning model 410 trained to imitate a generic player, as well as a corresponding personalized multi-layered machine learning model 420 trained to imitate a particular player. In one embodiment, the models 410 may be deep neural networks. For example, each of layers 1 through N of the generic model 410 may include a number of nodes or neurons, which may have edges or connections with associated weights to nodes or neurons of a preceding layer, as is known in the field of machine learning. The first layer N may receive input from an input layer 412A, and the last hidden layer N may include one or more connections to an output layer 418A. After the generic model is trained, in the illustrated embodiment, the hidden layers 1 through N of the generic model 410 may be frozen and retained for reuse in training a personalized model 420 to be trained to emulate behavior of a particular player.

In training the personalized model 420, edges may be generated between input layer 412B and the first frozen layer 1, and one or more new layers (which include layer N+1 in the illustrated example) may be generated. Edges and weights associated with the new layer(s) may be learned through the custom training phase discussed above, with final output (such as a predicted in-game action to be performed) provided by an output layer 418B.

Example Stackable Imitation Models

Figure 5:
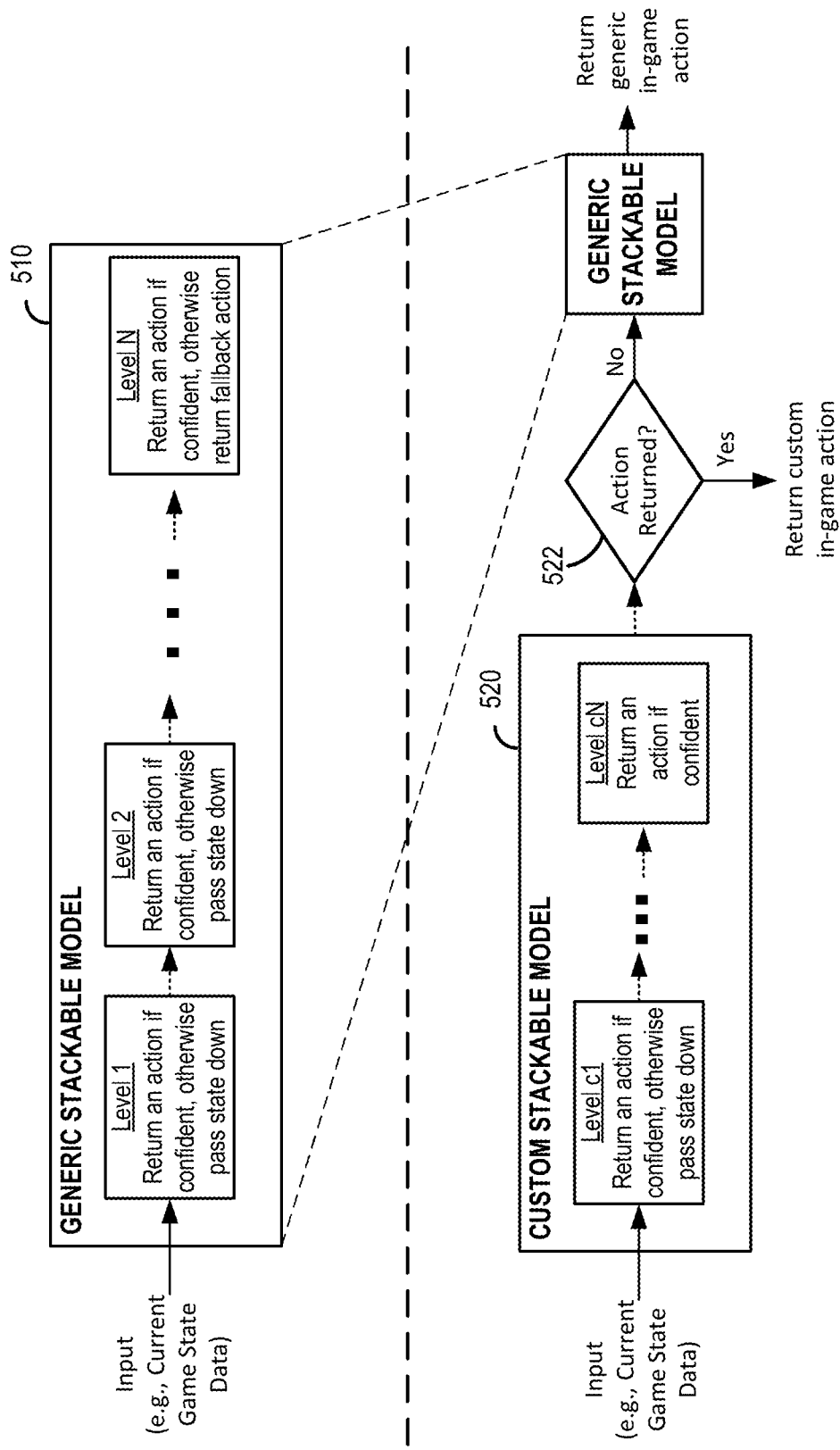
FIG. 5 provides an illustrative visual representation of a stackable model trained to imitate a generic player using multiple stacked levels, as well as corresponding custom levels that personalize the generic stackable model to imitate a particular player.

FIG. 5 provides an illustrative visual representation of a stackable model 510 trained to imitate a generic player (referred to in the figure as a generic stackable model) using multiple stacked levels, as well as corresponding custom levels that personalize the generic stackable model to imitate a particular player (the combined use of the custom levels and the generic stackable model referred to in the figure as a custom stackable model). While FIG. 5 provides examples of a generic model that has a single linear path of checks through successive levels, it will be appreciated that various advantages of the customized behavior modeling features described herein may not be particular to any specific model type. For example, as discussed above, a player imitation model as described herein may take other forms in other embodiments, such as a decision tree, a Markov model, various ensemble learning approaches, a deep neural network and/or other methods of modeling behavior or controlling an AI or NPC entity in a video game. Thus, the illustrative examples described below with respect to FIG. 4 should not be read as limiting the types of AI or behavioral models that may be employed in customizing a generic player behavior model.

As illustrated in FIG. 5, current game session data may be provided as input to a trained generic stackable imitation model 510. The current game session data may include, for example, game state data of a game currently being played, player input, actions taken, virtual environment data, and/or any other game data that may influence a player's choice of commands or actions in a given in-game situation. The generic model may have been previously trained to control an in-game character in a manner that mimics, emulates or imitates typical player behavior across a number of observed players' historical gameplay data. Both the training data used in training and the game state input data provided in a given instance may have first had quantization applied, compression, rounding or other manipulations to the raw game session data received.

As shown in the visual representation of the generic stackable model 510 of FIG. 5, the generic model is a stackable model in which higher priority actions or states have been stored in the lower numbered levels that are checked first within the model. For example, Level 1 may implicate a game state factor or rule that is very likely to override other game state factors or rules at lower levels (e.g., if a player's character is being shot at from close range, that may be sufficient game state information to determine a responsive action to run, even if the player's character has never been shot at in the particular current map location before or typically doesn't run when at the current map location). As illustrated, the generic model may first determine a confidence score that the player would perform a particular action associated with Level 1 given the current game state and the rules or game state information associated with Level 1. If the confidence score meets a threshold, the generic model 510 may stop progressing through the levels and may output the action determined at Level 1.

Otherwise, the generic model 510 may progress through its levels, passing the current game state down to each successive stackable level until determining an action with a confidence score that meets the threshold. If the last level of the generic model 510 (identified as Level N in FIG. 5) is reached and fails to determine an action based on the current game state, a default or fallback action may be determined. In some embodiments, the fallback action may be to do nothing or to continue any previous action (e.g., keep walking in the current direction if the virtual character is already walking). In other embodiments, the generic model 510 may pass the game state information to a different model (not illustrated) to determine an action when the given generic model does not have a suggested action.

As further illustrated in FIG. 5, the custom stackable model 520 may include (similarly to the generic custom model 510) a number of levels, shown as Level c1 through Level cN. The custom levels may have been generated in order to capture differences between observed player behavior of a particular player (to whom the custom model was trained) relative to the behavior captured in the levels of the generic model. The generic model 510 in this instance may have had its levels frozen or locked prior to beginning the customization training process of creating custom Levels c1 through cN that build on the levels of the generic model 510.

Updating the custom stackable model 520 during a training process for a particular player may include repeatedly adding new stacks or levels to the model that each incorporate a new rule based on a given observed game state in the training data. This approach may enable iterative building of a model in real time rather than implementing a full retraining of the model. In some instances in which newly observed in-game actions or control commands from a player during a customization training phase do not deviate substantially from the generic model's predictions of how a typical player would behave in the given game state, the generic model may be relied upon to handle the given game state without creation of any new custom level.

Use of the trained custom model 520 may involve receiving input data, such as current game state information within a real time instance of a game, iteratively checking through the custom levels (e.g., Level c1 through Level cN) until a custom level has sufficient confidence in an action to return for performance in the game, if any. If all levels of the custom model 520 fail to determine an action to perform in the game for the given input game state data (e.g., the input game state has either not been observed in the custom training data, or it has been observed but the responsive player action was determined in training to not deviate substantially from the generic model 510), the input game state data may be passed to the generic stackable model 510 to be process as discussed above.

Overview of Computing Device

Figure 6:
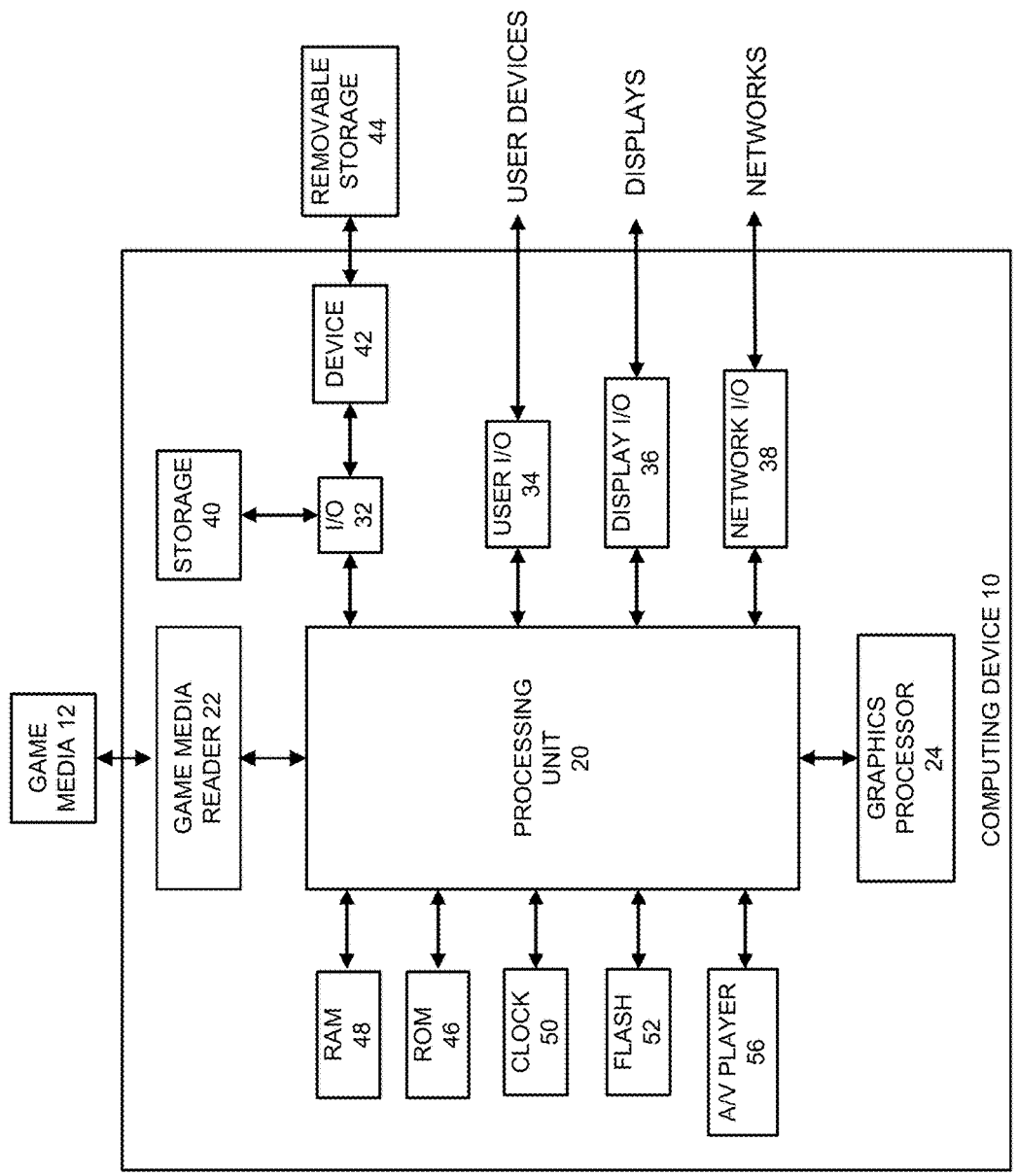
FIG. 6 illustrates an embodiment of a computing device that may implement aspects of the present disclosure.

FIG. 6 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. The computing device 10 may also be distributed across multiple geographical locations. For example, the computing device 10 may be a cluster of cloud-based servers. In some embodiments, the player computing system 102 may include one or more of the components illustrated in FIG. 6, while in other embodiments, the interactive computing system 120 may include one or more of the components illustrated in FIG. 6.

As shown, the computing device 10 includes a processing unit 20 that interacts with other components of the computing device 10 and also external components to computing device 10. A game media reader 22 is included that communicates with game media 12. The game media reader 22 may be an optical disc reader capable of reading optical discs, such as CD-ROMs or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld game application device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played.

User I/O 34 is used to send and receive commands between processing unit 20 and user devices, such as game controllers. In some embodiments, the user I/O 34 can include a touchscreen input. The touchscreen can be capacitive touchscreen, a resistive touchscreen, or other type of touchscreen technology that is configured to receive user input through tactile inputs from the player. Display I/O 36 provides input/output functions that are used to display images from the game being played. Network I/O 38 is used for input/output functions for a network. Network I/O 38 may be used during execution of a game, such as when a game is being played online or being accessed online.

Display output signals produced by display I/O 36 comprise signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise a hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM 48 is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads game media 12 and provides an application, information may be read from game media 12 and stored in a memory device, such as RAM 48. Additionally, data from storage 40, ROM 46, servers accessed via a network (not shown), or removable storage media 44 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system comprising:
 a data store that stores a generic player behavior model associated with one or more video games, wherein the generic player behavior model is configured to provide an indication of an in-game action to be performed in each of a plurality of gameplay situations; and
 a computing system in electronic communication with the data store and configured to execute computer-readable instructions that configure the computing system to:
  retrieve the generic player behavior model from the data store, wherein the generic player behavior model has been trained prior to retrieval based on gameplay data of one or more players without reference to gameplay data of a first player, wherein the generic player behavior model is a machine learning model comprising a plurality of layers;
  obtain gameplay data for the first player, wherein the gameplay data identifies in-game actions performed by the first player in each of a plurality of game states in a video game;

designate at least a subset of the plurality of layers in the generic player behavior model as frozen layers to be used in a custom model associated with the first player;

generate one or more custom layers for the custom model based on the gameplay data for the first player, wherein the one or more custom layers rely at least in part on the frozen layers of the generic player behavior model in order to predict in-game actions that would be performed by the first player in at least one or more game states; and store a trained custom model associated with the first player, wherein the trained custom model includes the one or more custom layers and further includes or relies on the frozen layers of the generic player behavior model, wherein the trained custom model is configured to receive data regarding a game state of the video game as input and to output an automated action to be performed in the video game.

2. The system of claim 1, wherein the computing system is one of a video game console system, a mobile phone, a tablet device, or a personal computer.

3. The system of claim 2, wherein the computing system has sufficient processing capabilities to train the one or more custom layers but insufficient processing capabilities to fully train a model having a level of complexity of the generic player behavior model.

4. The system of claim 1, wherein use of the frozen layers in the trained custom model enables the trained custom model to determine an automated action to output when provided with an input game state that does not appear in the gameplay data for the first player.

5. The system of claim 1, wherein the generic player behavior model is a first deep neural network, wherein the trained custom model is a second deep neural network that includes more layers than the first deep neural network.

6. The system of claim 5, wherein a majority of layers in the second deep neural network are frozen layers from the first deep neural network, and wherein the one or more custom layers include a new output layer that differs from an original output layer of the first deep neural network.

7. The system of claim 1, wherein the computing system is further configured to provide at least the one or more custom layers of the custom model associated with the first player to a second computing system of a second player in order for a game application operating on the second computing system to imitate gameplay of the first player.

8. A computer-implemented method comprising:
under the control of a computer system comprising computer hardware, the computer system configured with computer executable instructions:
obtaining a generic player behavior model, wherein the generic player behavior model is trained based on gameplay data of a plurality of players of a video game, wherein the generic player behavior model is configured to provide an indication of an in-game action to be performed in each of a plurality of gameplay situations;

obtaining gameplay data for a first player, wherein the gameplay data identifies in-game actions performed by the first player in each of a plurality of game states in the video game, wherein the first player is not one of the plurality of players associated with training of the generic player behavior model;

incorporating a plurality of portions of the generic player behavior model into a custom model associated with the first player, wherein the plurality of portions each comprise a layer or a level in the generic player behavior model;

generating one or more custom portions for the custom model based on the gameplay data for the first player, wherein generating the one or more custom portions includes training the custom model to predict in-game actions that would be performed by the first player in particular game states, wherein the training includes repeatedly updating the one or more custom portions without changing the plurality of portions of the generic player behavior model incorporated into the custom model; and storing the custom model after the training as a trained custom model associated with the first player, wherein the trained custom model includes the one or more custom portions and further includes or relies on the plurality of portions of the generic player behavior model, wherein the trained custom model is configured to receive data regarding a game state of the video game as input and to output an automated action to be performed in the video game.

9. The computer-implemented method of claim 8, wherein the generic player behavior model comprises a deep neural network, and wherein each of the plurality of portions of the generic player behavior model is a different layer in the deep neural network.

10. The computer-implemented method of claim 8, wherein the generic player behavior model is a stackable model, wherein each of the plurality of portions of the generic player behavior model is a different level in the stackable model.

11. The computer-implemented method of claim 10, wherein the trained custom model is configured to, in a given instance of the trained custom model being provided a first game state as input:
determine whether a level in the one or more custom portions is able to predict a first automated action associated with the first game state with at least a threshold confidence; and
based on the level in the one or more custom portions predicting the first automated action with the least a threshold confidence, causing the first automated action to be performed in the video game without considering any portions of the generic player behavior model in the given instance.

12. The computer-implemented method of claim 8 further comprising updating the one or more custom portions for the custom model based on a discriminator trained using generative adversarial imitation learning to reward output of the custom model that appears to the discriminator to be an action of the first player.

13. The computer-implemented method of claim 8 further comprising:
receiving a selection by a second player of a first character in the video game to behave in an instance of the video game as though the first character is under control of the first player; and
based at least in part on the selection:
executing the instance of the video game, wherein executing the instance of the video game comprising creating a virtual environment in which two or more characters of the video game interact;
causing a second character to perform actions within the instance of the video game responsive to control input provided by the second player; and causing the first character to perform actions within the instance of the video game that are determined by the custom model associated with the first player.

14. A non-transitory computer-readable storage medium having stored thereon computer-readable instructions that, when executed, configure a computing system to perform operations comprising:
   obtaining a generic player behavior model, wherein the generic player behavior model is configured to provide an indication of an in-game action to be performed in each of a plurality of gameplay situations in a video game;
   obtaining gameplay data for a first player, wherein the gameplay data identifies in-game actions performed by the first player in each of a plurality of game states in the video game;
   incorporating a plurality of portions of the generic player behavior model into a custom model associated with the first player, wherein the plurality of portions each comprise a layer or a level in the generic player behavior model;
   generating one or more custom portions for the custom model based on the gameplay data for the first player, wherein generating the one or more custom portions includes training the custom model to predict in-game actions that would be performed by the first player in particular game states, wherein the training does not alter at least a subset of the plurality of portions of the generic player behavior model incorporated into the custom model; and
   storing the custom model after the training as a trained custom model associated with the first player, wherein the trained custom model includes the one or more custom portions and further includes or relies on the plurality of portions of the generic player behavior model, wherein the trained custom model is configured to receive data regarding a game state of the video game as input and to output an automated action to be performed in the video game.

15. The non-transitory computer-readable storage medium of claim 14, wherein the operations further comprise generating a plurality of custom models each configured to imitate gameplay of a different player, wherein each of the plurality of custom models include the same portions of the generic player behavior model as each other.

16. The non-transitory computer-readable storage medium of claim 15, wherein the operations further comprise tracking character success in the video game of characters controlled by each of the plurality of custom models in gameplay against actual player competitors.

17. The non-transitory computer-readable storage medium of claim 16, wherein the operations further comprise generating a ranking of models among the plurality of custom models, wherein the ranking indicates relative in-game success of each of at least a subset of the models in actual gameplay.

18. The non-transitory computer-readable storage medium of claim 14, wherein the operations further comprise executing a training environment within the video game, wherein the training environment presents simplified game states for player interaction, and wherein training data for generating the one or more custom portions for the custom model is collected based on control input received from the first player with the training environment.

19. The non-transitory computer-readable storage medium of claim 18, wherein the complexity of game states presented within the training environment increases over time.

20. The non-transitory computer-readable storage medium of claim 14, wherein the trained custom model comprises at least one of a decision tree, a Markov model, or a deep neural network.

* * * * *